(12) United States Patent
Sahlem

(10) Patent No.: US 8,950,777 B1
(45) Date of Patent: Feb. 10, 2015

(54) JACK STABILIZING DEVICE

(71) Applicant: Donald Sahlem, Akron, NY (US)

(72) Inventor: Donald Sahlem, Akron, NY (US)

(*) Notice: Subject to any disclaimer, the term of this patent is extended or adjusted under 35 U.S.C. 154(b) by 0 days.

(21) Appl. No.: 14/274,608

(22) Filed: May 9, 2014

Related U.S. Application Data

(60) Provisional application No. 61/855,555, filed on May 16, 2013.

(51) Int. Cl.
*B60S 9/02* (2006.01)
*B60S 9/04* (2006.01)

(52) U.S. Cl.
CPC .......................... *B60S 9/04* (2013.01)
USPC ........................................................ 280/763.1

(58) Field of Classification Search
USPC ................ 280/763.1, 764.1, 765.1, 766.1; 254/424, 425, 419
See application file for complete search history.

(56) References Cited

U.S. PATENT DOCUMENTS

| | | | | |
|---|---|---|---|---|
| 3,475,008 | A * | 10/1969 | Taylor | 254/424 |
| 3,501,120 | A | 3/1970 | Daniel | |
| 6,089,603 | A * | 7/2000 | Ackley | 280/765.1 |
| 6,224,102 | B1 * | 5/2001 | Nebel | 280/765.1 |
| 6,494,487 | B1 * | 12/2002 | Nebel | 280/765.1 |
| 7,188,842 | B2 | 3/2007 | Thorpe | |
| 7,338,052 | B2 * | 3/2008 | Hanscom | 280/6.153 |
| 8,448,921 | B2 * | 5/2013 | Hernandez | 254/88 |
| 2009/0102176 | A1 * | 4/2009 | Garceau | 280/763.1 |

* cited by examiner

*Primary Examiner* — John Walters
*Assistant Examiner* — James Triggs

(57) ABSTRACT

A stabilizing device for vertically extending jacks is described. The stabilizing device is comprised of a base link attached to an RV, a short connecting link, a long connecting link and a stabilizing link, forming a four link mechanism whereby the combined pivoting of each link results in a nearly straight line vertical movement at the distal end of the stabilizing link which is pivotally attached to a vertically extending jack. This combination of elements allows for the unimpeded vertical movement of the jack while at the same time restricting the horizontal movement of the jack thereby forming a stabilizer that functions automatically.

8 Claims, 10 Drawing Sheets

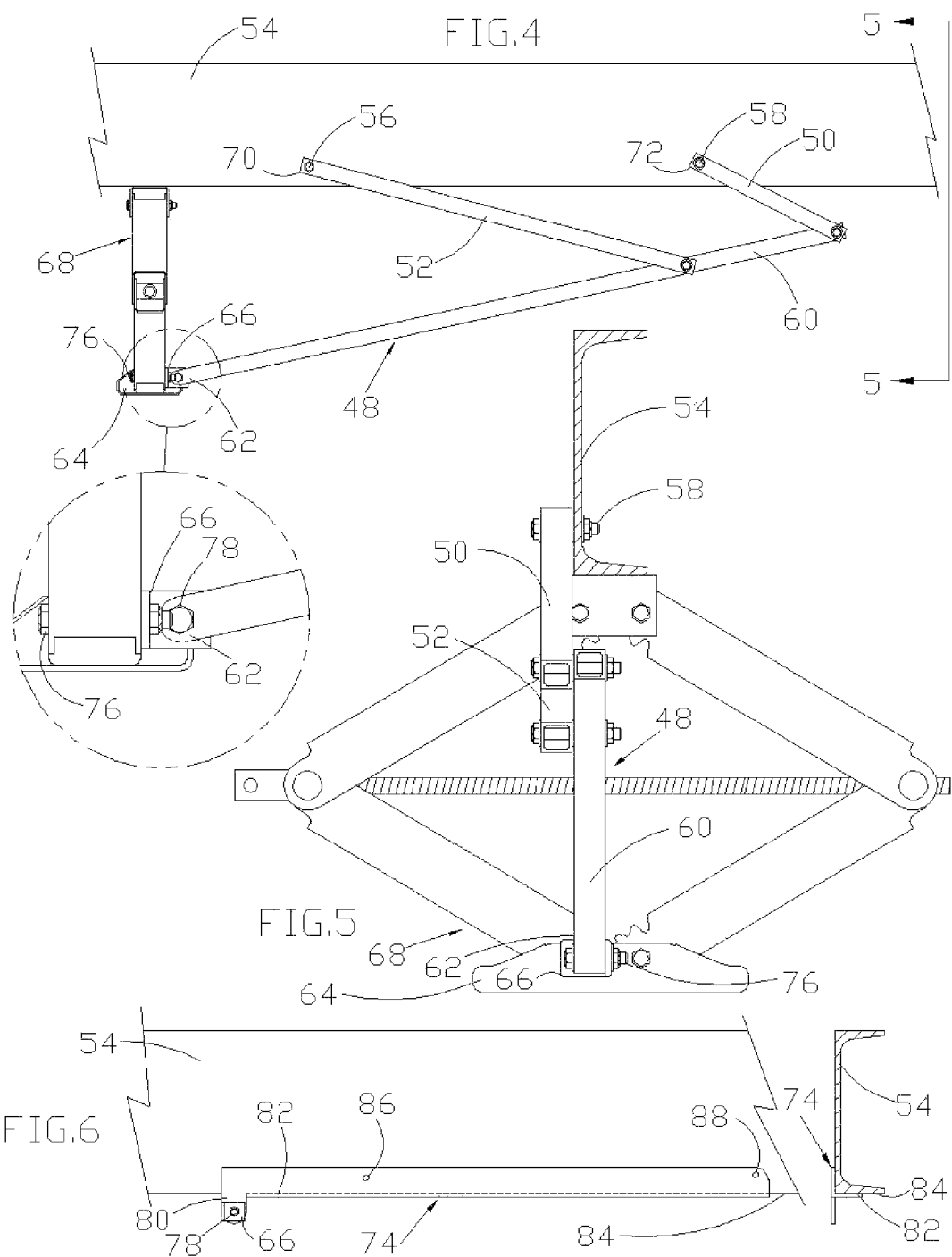

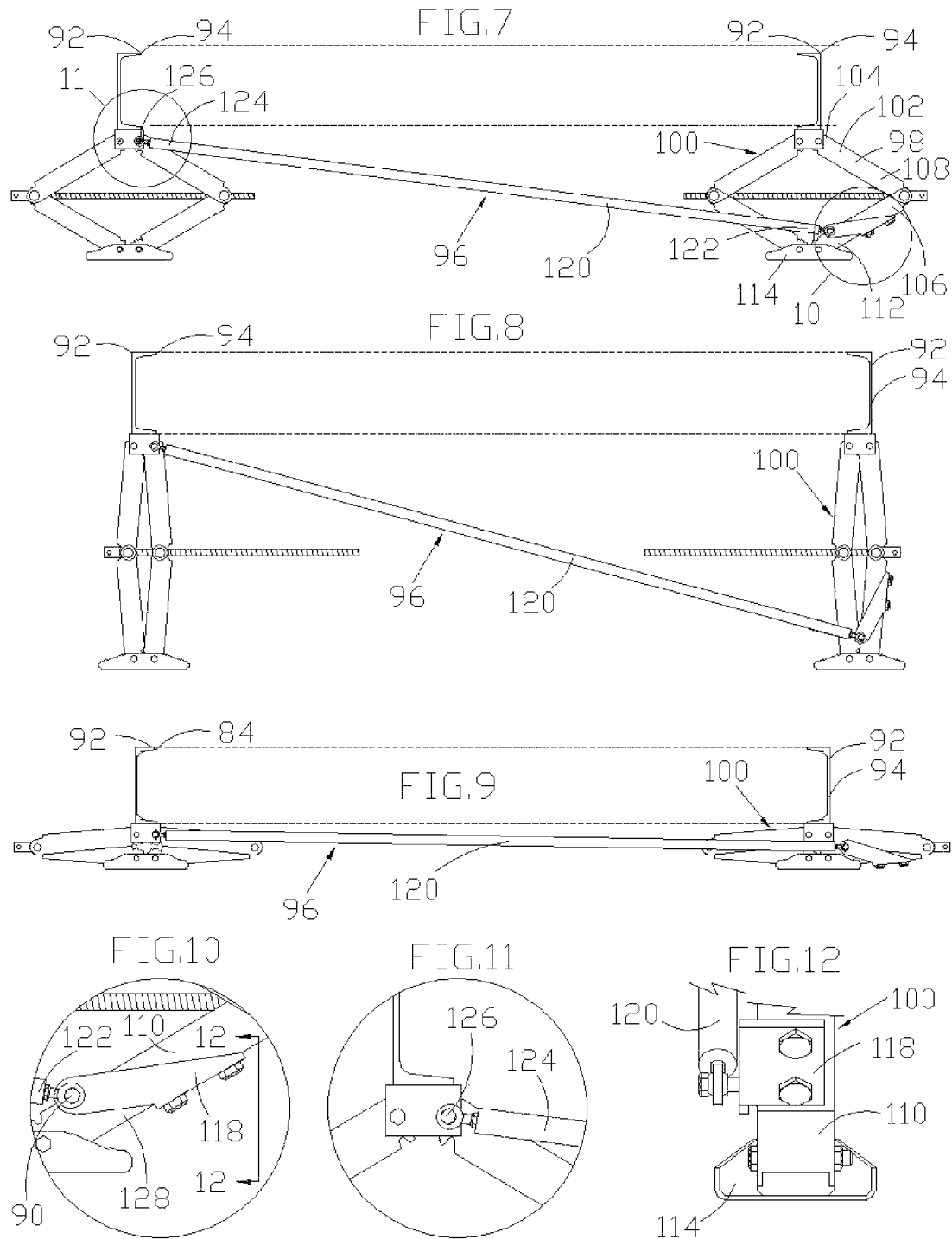

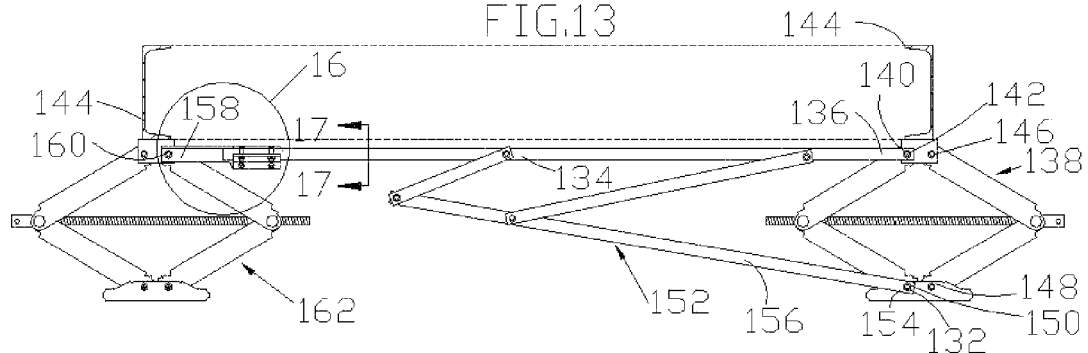
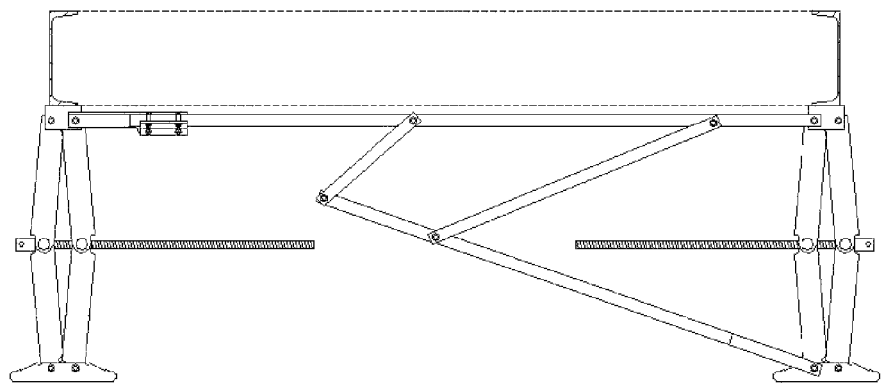
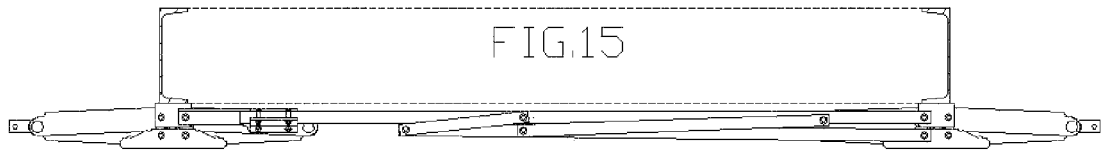
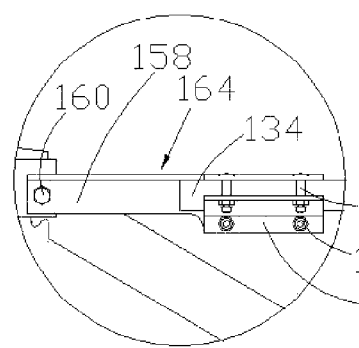 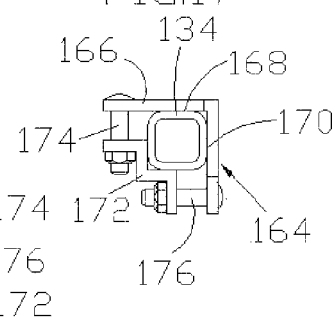 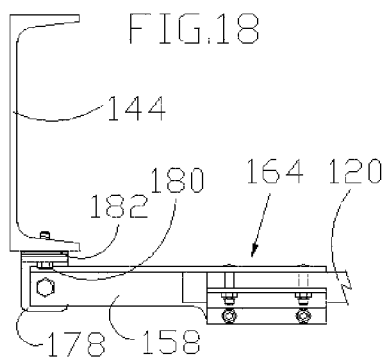

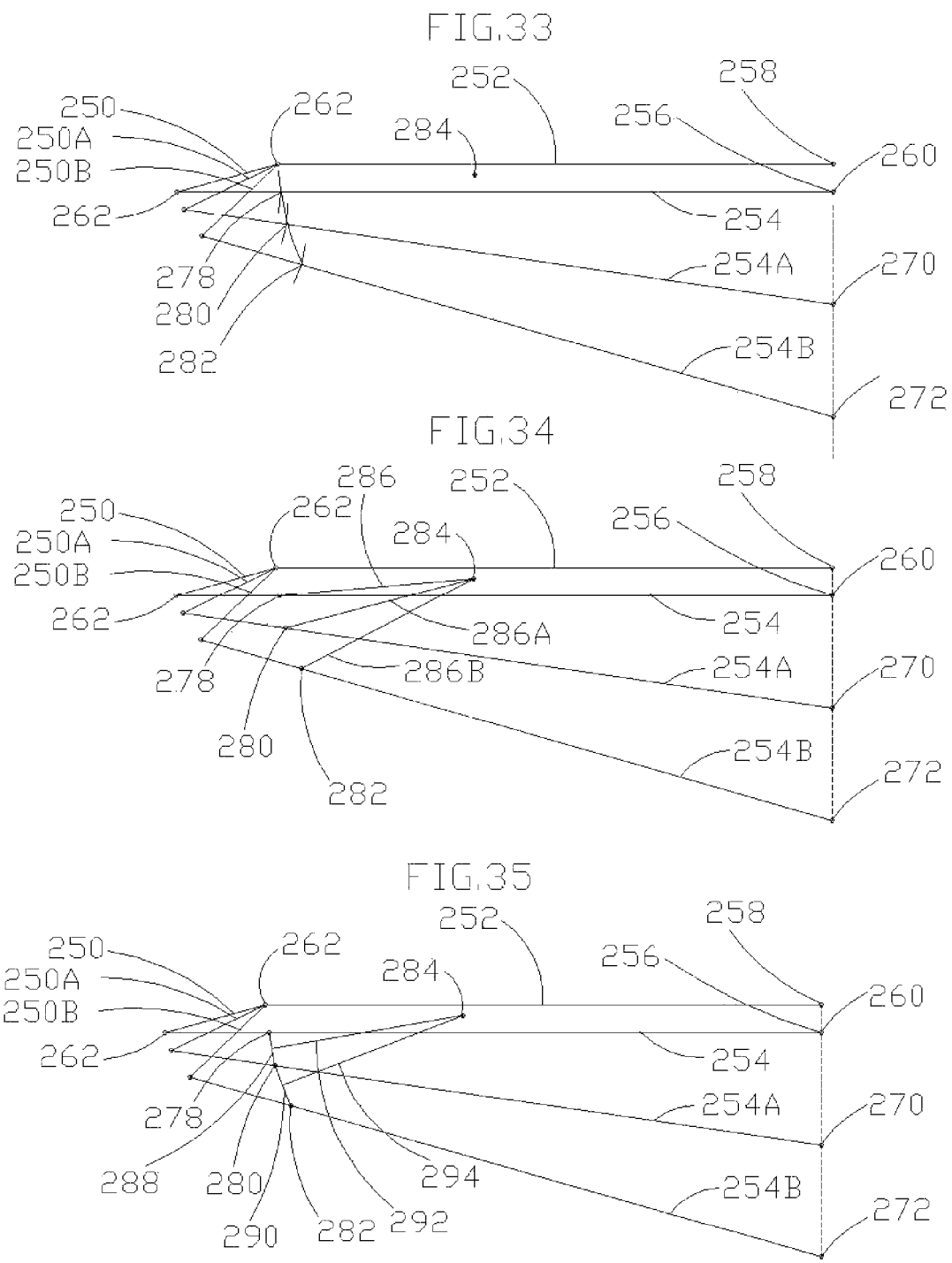

JACK STABILIZING DEVICE

CROSS-REFERENCE TO RELATED APPLICATIONS

This application claims the benefit of PPA 61/855,555 dated May 16, 2013

BACKGROUND OF THE INVENTION

1. Field of Invention

The present invention relates to jack stabilizing devices commonly found on recreational vehicles such as motor homes and trailers. Recreational vehicles or RV's typically have vertically extending jacks attached to the frame near the corners of the vehicle. When parked, these jacks are extended to the ground and provide a means for leveling the RV in addition to supporting the weight of the RV. This support prevents vertical movement of the vehicle as the occupants of the RV move about it. While offering a great deal of weight capacity, most RV jacks provide little resistance to side to side movement caused by wind or people moving inside the RV. A mechanical jack stabilizer that effectively limits lateral movement between the lower portion of the jack and the RV frame is achieved by this invention utilizing a four link mechanism as described herein.

2. Prior Art

Previously, strut type devices have been employed to stop lateral movement in RV jacks. They fall into two basic designs. The first consists of a first hollow tube telescopically fitted inside a second hollow tube. The non-telescoped ends of each tube are pivotally attached to the frame of the trailer and the foot of the jack. The result is a tube that can shorten or elongate to accommodate the changing distance from the RV frame to the foot of the jack as the jack is extended or retracted. Once the jack is lowered to its operating height, a locking nut is tightened between the two telescoped sections, fixing the length of the two telescoped sections and the strut assembly provides lateral stability to the jack. The second design employs a single piece strut pivotally attached at one end to the foot of the jack. The opposite end of the strut slides through a clamping device attached to the frame of the RV. The clamp is left loose until the jack is lowered to its operating height. The clamping device is then tightened and the jack is laterally stabilized. Both of these types of stabilizers work well, but have the disadvantage of having to be manually tightened after the jacks are extended, and then loosened prior to the jacks being retracted. The locking nuts or clamps are located underneath the RV. Depending on the conditions where the RV is parked, such as mud or wet grass, or for physically challenged people who may not have the flexibility to get under their RV, tightening and loosening the jack stabilizers can be quite inconvenient.

Previously, four link devices have been designed to achieve straight line support of movement over short distances. These types of devices required three or more planes of operation making them bulky. In order to achieve any significant length of straight line operation, these devices operate on both sides of a mounting link and have a center of stroke, or neutral point in their stroke where the device may actually track on to a curved path or continue in a straight line path depending on how they are loaded. This type of device is not suited to the objects of the current invention.

OBJECTS AND ADVANTAGES

The objects and advantages of the present invention are:

(a) To provide a jack stabilizer that automatically adjusts to the distance between the lower portion of the jack and the frame of the RV as the jack is extended downward, thereby giving lateral stability to the RV without the need to manually lock the stabilizer in place.

(b) To provide a jack stabilizer that is easily installed and adaptable to a wide range of jack configurations.

(c) To provide a jack stabilizer that has a long, near straight line path of support to accommodate high range jacks.

Further objects and advantages of my invention will become apparent from a consideration of the drawings and the ensuing description.

SUMMARY OF THE INVENTION

The present invention, a jack stabilizer, is directed to an easily installed, versatile four-link mechanism that gives lateral support to vertically extending jacks and automatically adjusts to the jack as it extends or retracts.

BRIEF DESCRIPTION OF THE DRAWINGS

FIG. 4 is a front view of an embodiment of the jack stabilizer assembly attached to a scissors jack where the connecting links are attached directly to the RV frame.

FIG. 5 is an end view of the jack stabilizer assembly shown in FIG. 4.

FIG. 6 is a side and end view of a template used to mount the jack stabilizer shown in FIGS. 4 and 5.

FIG. 7 is a front view of an embodiment of the jack stabilizer assembly, where components of the RV double as components of the invention.

FIG. 8 is a front view of the assembly shown in FIG. 7, shown fully extended.

FIG. 9 is a front view of the assembly shown in FIG. 7, shown fully retracted.

FIG. 10 is a front view of a mounting bracket detail of the jack stabilizer device of FIG. 7.

FIG. 11 is an front view of a mounting detail of the jack stabilizer device of FIG. 7.

FIG. 12 is a side view of the mounting bracket detail of the jack stabilizer device of FIG. 7.

FIG. 13 is a front view of an embodiment of the jack stabilizer assembly, where the base link is elongated, shown attached to two partially extended scissors jacks.

FIG. 14 is a front view of the assembly shown in FIG. 7, shown fully extended.

FIG. 15 is a front view of the assembly shown in FIG. 7, shown fully retracted.

FIG. 16 is a side view of an end detail of the base link of the jack stabilizer device of FIG. 7 and associated adjustable mounting bracket.

FIG. 17 is an end view of an end detail of the base link of the jack stabilizer device of FIG. 7 and associated adjustable mounting bracket.

FIG. 18 is a front view of an angle bracket detail of the base link of the jack stabilizer device.

FIG. 33 is a schematic view of additional design elements of the jack stabilizer, adding in construction of the other location of the long connecting link.

FIG. 34 is a schematic view of completion of the design elements of the jack stabilizer.

FIG. 35 is a schematic view of an alternate method for determining length and location of the long connecting link.

DETAILED DESCRIPTION

Figure 1:
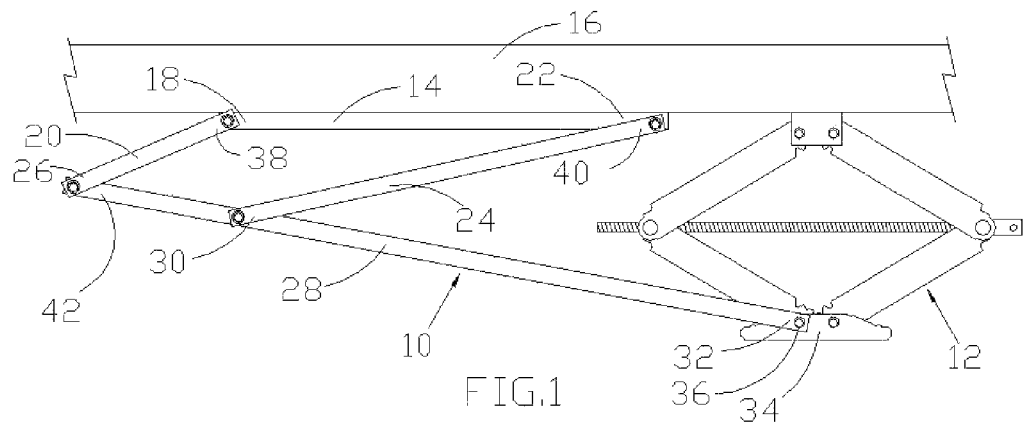
FIG. 1 is a front view of the jack stabilizer, installed and partially extended.
Figure 2:
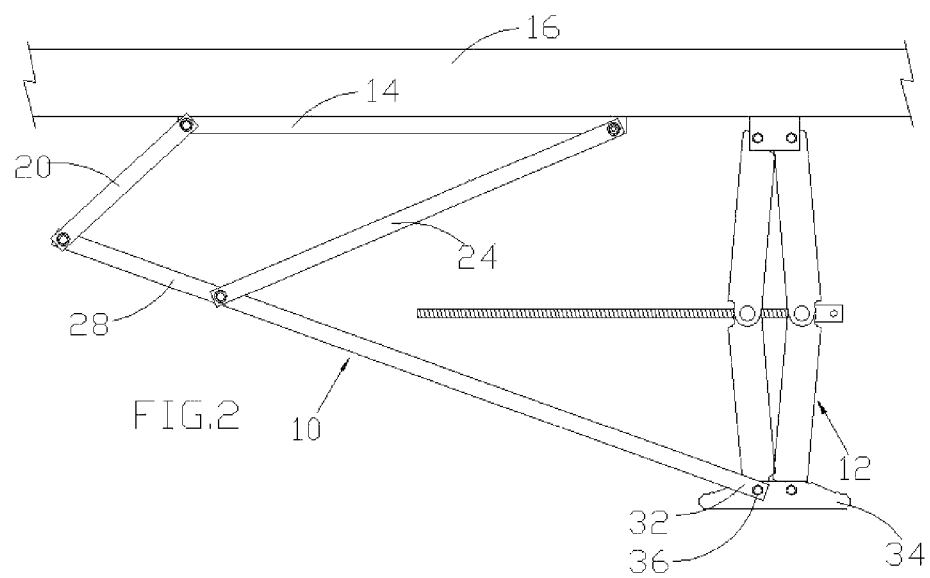
FIG. 2 is a front view of the jack stabilizer, installed and fully extended.
Figure 3:
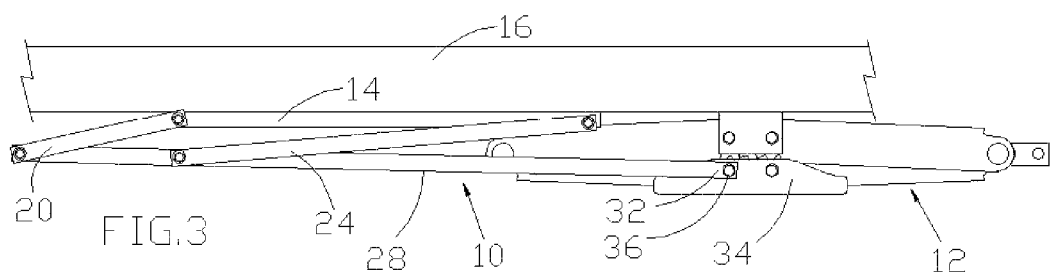
FIG. 3 is a front view of the jack stabilizer, installed and fully retracted.

This invention relates to lateral stabilization of vertically extending RV jacks. FIG. 1 shows the invention 10, connected to a partially extended scissors jack 12. Starting at the top, the first component is a base link 14 which is generally horizontal and rigidly attached to an RV frame 16. Pivotally attached at a first end 18 of the base link 14 is a first end 38 of a short connecting link 20. Further along the length of the base link 22, a first end 40 of a long connecting link 24 is also pivotally attached to the base link 14. A second end 26 of the short connecting link 20 is pivotally attached to one end 42 of a stabilizing link 28 as is a second end 30 of the long connecting link 24. The distal end 32 of the stabilizing link 28 is pivotally attached to a foot 34 of a jack 12 via a lower pivot bolt 36 of the jack 12. The four links 14, 20 24 and 28 comprise a four link mechanism structured to limit lateral movement of the jack relative to the RV, thereby stabilizing the RV. As the jack extends or retracts, the invention 10 extends or retracts, moving freely with the foot 34 of the jack 12 allowing vertical movement, but limiting lateral movement, regardless of the vertical position of the jack. The four links 14, 20, 24 and 28 are sized and positioned such that the distal end of the stabilizing link end 32 moves in a path that is essentially perpendicular to the base link 14. While the vertical path of the distal end 32 of the stabilizing link 28 may not move in an exact straight line, the variation from a straight line can be within the lateral free play of the jack 12. In use, the jack 12 is lowered to the ground under it and extended until a desired degree of weight bearing and or leveling is achieved. FIG. 2 shows the same components as FIG. 1, but with the jack fully extended. FIG. 3 shows the same components as FIG. 1, but with the jack fully retracted.

The invention can be configured into a number of embodiments, several of which are described as follows; FIGS. 4 and 5 show the invention 48 in an embodiment where the short connecting link 50 and long connecting link 52 are pivotally attached directly to the RV frame 54 via bolts 56, 58 or other fasteners to achieve pivoting connections. The stabilizing link 60 is pivotally attached to the ends of the short connecting link 50 and long connecting link 52, and the distal end 62 of the stabilizing link 60 is pivotally attached to the foot 64 of a jack 68 by way of an angle bracket 66. In this embodiment, the base link of the invention 48 consists of the RV frame 54. FIG. 5 shows an end view of the invention 48 attached to a scissors jack 68. In order to get the locations of the mounting holes 70, 72 correct, a template 74 (FIG. 6) can be used to locate the mounting holes 70, 72 relative to the stabilizing link distal end 62. In use, the angle bracket 66 would be attached to the pivot bolt 76 of the jack 68 (FIG. 4). The bolt 78 that normally mounts the angle bracket 66 to the stabilizing link 60 is used to temporarily pivotally fasten the locating leg 80 of the template 74 to the angle bracket 66. The jack 68 is then moved up or down until the lower horizontal face 82 of the template is flush with the bottom face 84 of the RV frame 54. The template 74 is then clamped to the RV frame 54, and the holes 86 and 88 in the template 74 provide guidance for drilling holes 70, 72 in the RV frame 54 at the proper location.

FIGS. 7 through 12 show an embodiment of the invention 96 where existing components of the RV and jacks also act as components of the invention. In this embodiment, the base link 92 of the invention 96 consists of the RV frame 94. The short connecting link 102 consists of an upper outboard leg 98 of the scissors jack 100. The stabilizing link 110 (see FIG. 10) consists of a lower outboard leg 128 of the scissors jack 100, and the long connecting link 120 is a separate component which completes the four-link mechanism of the invention. The four links 92, 102, 110 and 120 comprise a four link mechanism structured to limit lateral movement of the jack relative to the RV, thereby stabilizing the RV. In this embodiment, the short connecting link 102 is pivotally attached at a first end 104 to the base link 92, and at a second end 108 to the stabilizing link 110. The long connecting link 120 is pivotally attached at a first end 124 to the base link 92 and pivotally attached at a second end 122 to the stabilizing link 110, and the distal end 128 of the stabilizing link is pivotally attached to the foot 114 of the scissors jack 100. The stabilizing link bracket 118 forms a part of the stabilizing link 110 and properly locates the pivot axis 90. FIG. 8 shows the device of FIG. 7 in a fully extended position. FIG. 9 shows the device of FIG. 7 in a fully retracted position. FIGS. 10 and 11 show detailed views of the connected ends 122, 124 of the long connecting link 120 along with the mounting bracket 118. FIG. 12 shows and end view of the lower outboard leg 110 of the jack 100 along with the mounting bracket 118. This embodiment has the advantage of minimizing the number of components needed to create the invention 96.

The next embodiment of the invention 152 is shown in FIG. 13. In this embodiment, the base link 134 is elongated on both ends. The end 136 nearest the jack 138 being stabilized has a hole 140 formed in it to facilitate attaching directly to the upper pivot bolt 142 of the scissors jack 138, which is rigidly mounted to the RV frame 144. The upper pivots 142, 146 of the jack 138 are situated directly above the lower pivots 148, 150 of the jack 138. The invention 152 is based on a perpendicular movement relative to the RV frame 144 as is the movement of the jack 138. It is therefore advantageous to mount the end of the base link 136 directly at the upper pivot bolt 140 of the scissors jack 138, and to mount the distal end 154 of the stabilizing link 156 at the lower pivot bolt 132 of the scissors jack 138. At the same time, the opposite end 158 of the base link 134 can be mounted to the upper pivot bolt 160 of the jack 162 situated on the opposite side of the RV, as it is usually the case that the jacks are located in this manner. FIG. 14 shows the embodiment of FIG. 13, shown in a fully extended position. FIG. 15 shows the embodiment of FIG. 13, shown in a fully retracted position. FIGS. 16 and 17 show an adjustable mounting bracket 164 for mounting the opposite end 158 of the base link 134 to the pivot bolt 160. The adjustable mounting bracket 164 is composed of an angled section 166 that contacts the base link 134 on two sides 168, 170. The angled section 166 is clamped in place via a clamping section 172 which is held in place by bolts 174, 176. This arrangement allows for mounting the base link 134 on a range of frame widths and provides a rigid mounting of the base link 134 to the RV frame 144 via the jacks 138, 162. This mounting of the base link 134 to the jacks 138, 162 is perpendicular to the extending path of the jack 138, and has the advantage of mounting the invention 152 without the need to drill any holes in the RV. In cases where the there is no jack 162 opposite the jack 138 being stabilized, the opposite end 158 of the base link 134 can be attached to the RV frame 144 as shown in FIG. 18. Angle bracket 178 is attached to the end 158 of the adjustable mounting bracket 164, and bolted 180 to the RV frame 144. Shims 182 can be used as required to match the vertical distance between the bottom of the RV frame 144 and the top of the base link 134 from side to side.

Figure 19:
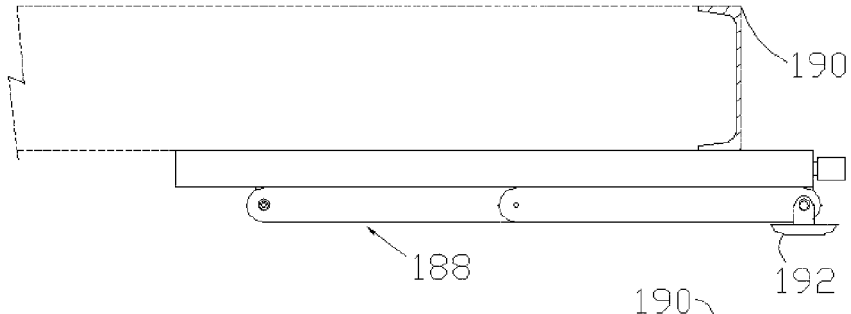
FIG. 19 is a front view of a telescopic jack, shown in a fully retracted position.
Figure 20:
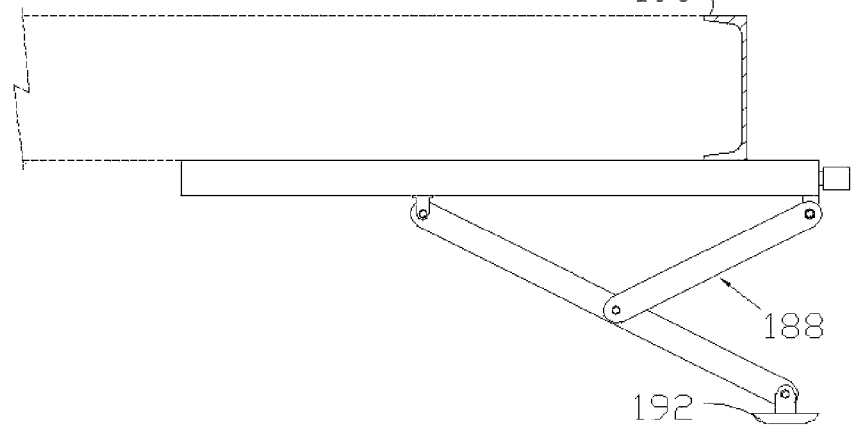
FIG. 20 is a front view of a telescopic jack, shown in a partially extended position.
Figure 21:
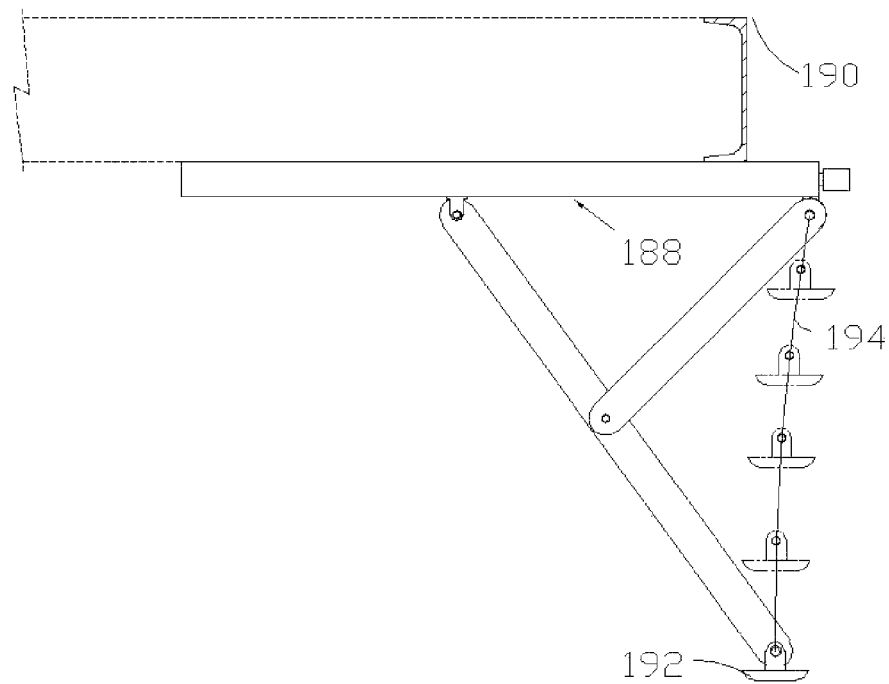
FIG. 21 is a front view of a telescopic jack, shown in a fully extended position.
Figure 22:
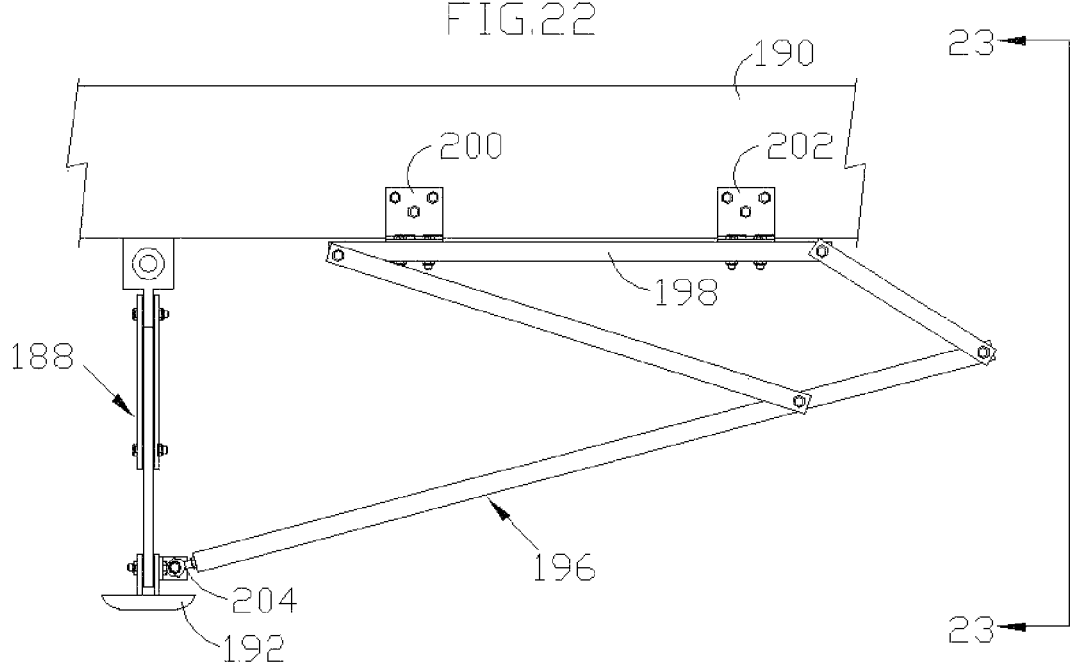
FIG. 22 is an end view of a telescopic jack and a front view of an attached jack stabilizer in an embodiment that allows for pivotal attachment of the base link to the RV.
Figure 23:
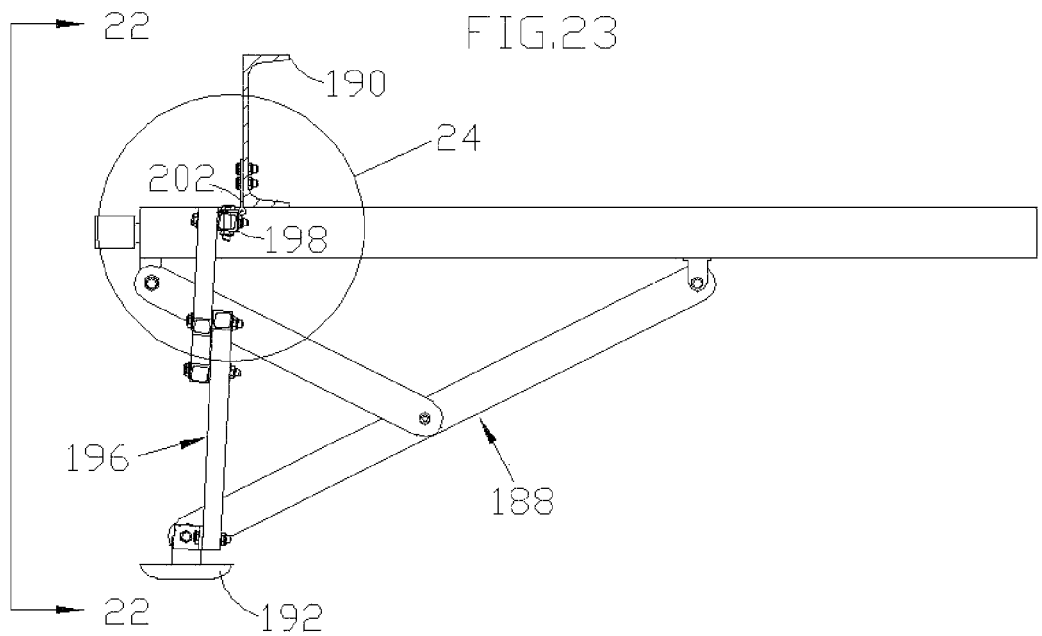
FIG. 23 is a front view of a telescopic jack and an end view of an attached jack stabilizer in an embodiment that allows for pivotal attachment of the base link to the RV.
Figure 24:
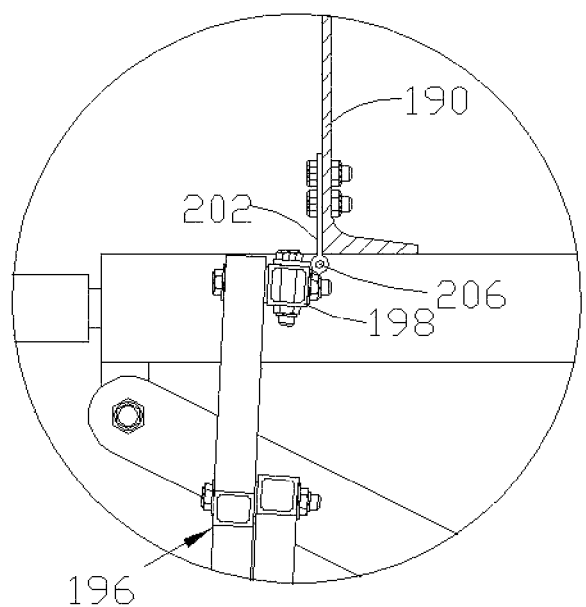
FIG. 24 is a detailed view of the hinge components of an embodiment that allows for pivotal attachment of the base link to the RV.

Another embodiment of the invention is suited to handle situations where the path of the jack follows a vertical or non-vertical path that lies in a vertical plane. This is the case for the telescopic jack 188 shown in FIGS. 19, 20 and 21. FIG. 19 shows a telescopic jack 188, which is rigidly attached to an RV frame 190, in a fully retracted position. FIGS. 20 and 21 show the jack partially and fully extended respectively. FIG. 21 shows the curved path 194 of the foot 192 (shown in phantom) at several locations. Telescopic jacks, due to their design, have lateral stability in a direction parallel to the length of the jack, but much less in a direction perpendicular to the length of the jack. This instability can be fixed by utilizing the invention 196 as shown in FIGS. 22 and 23. In this embodiment, the base link component 198 of the invention 196 is mounted to the RV frame 190, via pivots or hinges 200, 202 between the base link 198 and the RV frame 190. These hinges 200, 202 in addition to a rod end 204 allow the invention 196 to pivot about the center of the hinge pin 206 (see FIG. 24) and simultaneously extend or retract with the curved path 194 of the foot 192 of the jack 188 while providing stability in a direction perpendicular to the length of the jack 188.

Figure 25:
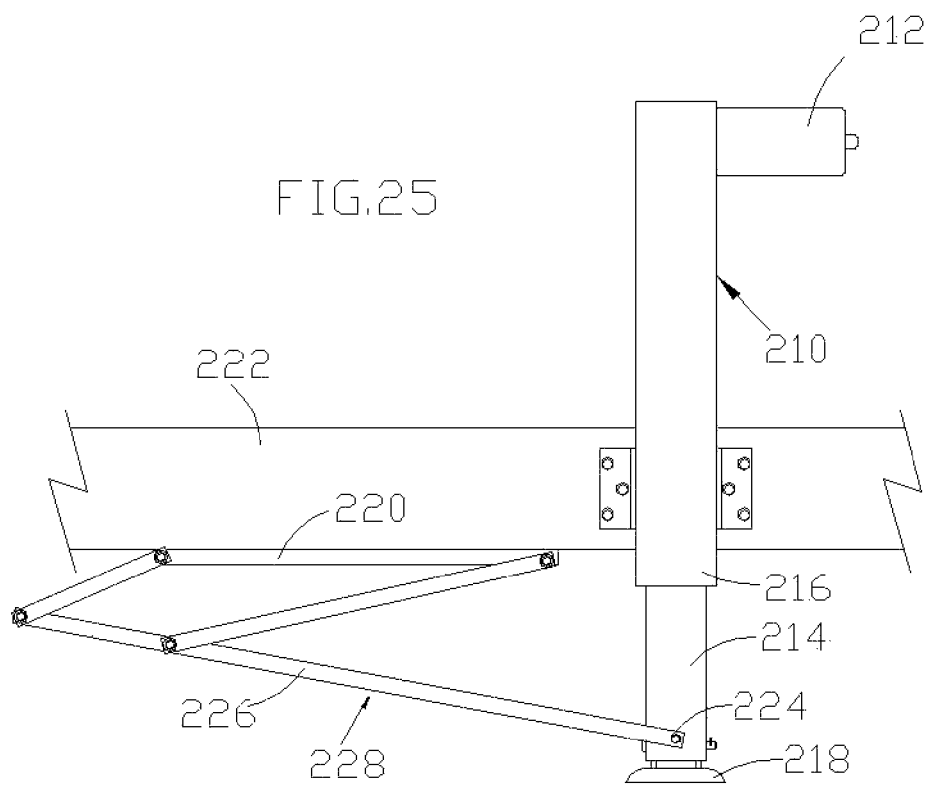
FIG. 25 is a front view of the jack stabilizer shown attached to a fifth wheel jack.

The invention can also be adaptable to fifth wheel jacks as shown in FIG. 25. In this embodiment, a fifth wheel jack 210 has a motor 212 that drives a mechanism that extends or retracts an inner square tubular leg 214 that telescopically fits inside an outer square tube 216. The gap between the outside of the inner square tubular leg 214 and the inside of the outer square tube 216 allows for some lateral movement of the jack foot 218. In this case the base link 220 is attached to the RV frame 222. The distal end 224 of the stabilizing link 226 is pivotally attached, to the foot 218 of the jack 210, at the inner square tubular leg 214. Alternately, the distal end 224 of the stabilizing link 226 could be pivotally attached directly to the foot 218.

Figure 26:
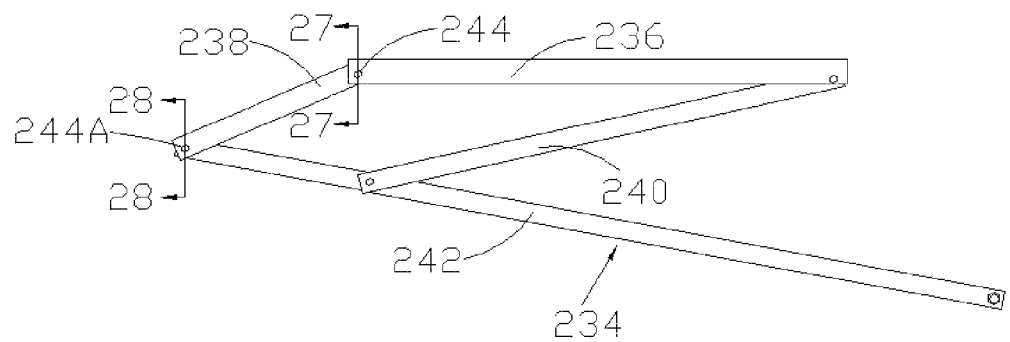
FIG. 26 is a side view of an embodiment of the jack stabilizer, showing a nested U-channel construction.
Figures 27, 28:
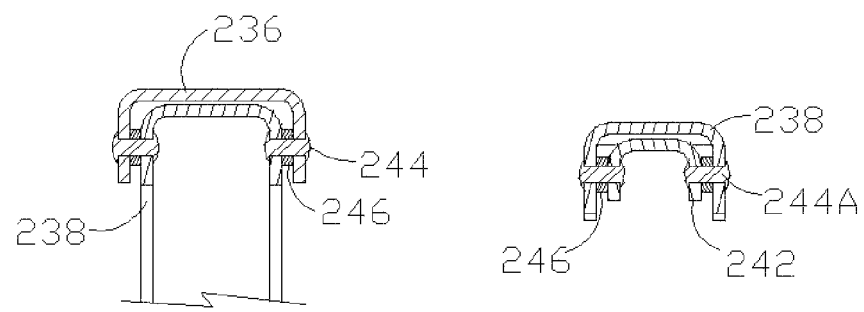
FIG. 27 is a sectional view of a portion of the jack stabilizer shown in FIG. 26.
FIG. 28 is a second sectional view of a portion of the jack stabilizer shown in FIG. 26.
Figure 29:
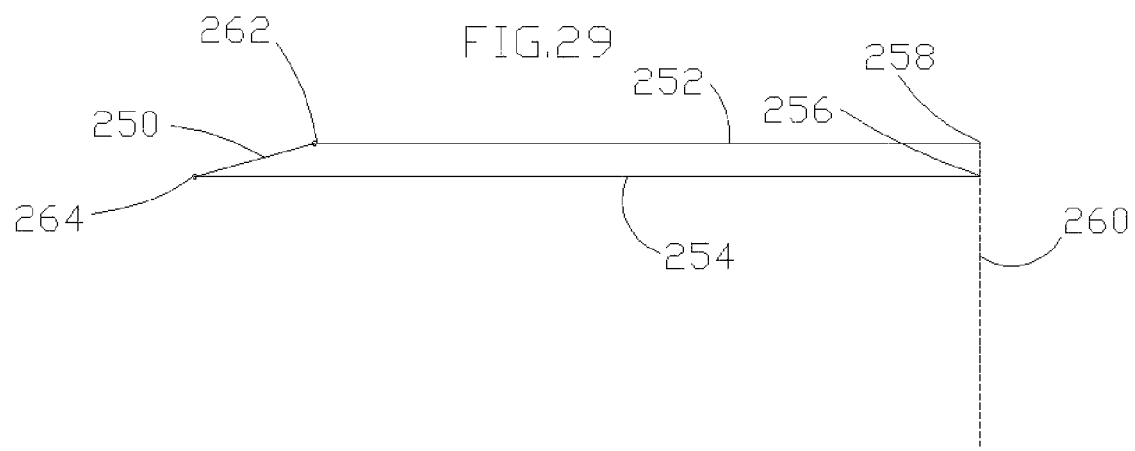
FIG. 29 is a schematic view of the initial design elements of the jack stabilizer.

An alternate embodiment to the design of the links is shown in FIGS. 26, 27 and 28. In this embodiment of the invention 234, the base link 236 is made of a channel shape with the open side facing down. This allows for nesting of the short connecting link 238 and the long connecting link 240 inside the base link 236, and be pivotally attached using rivets 244, 244A and spacers 246. Nested inside of the short connecting link 238 and long connecting link 240 is the stabilizing link 242. In this case, the long connecting link 240 has a similar cross section as the short connecting link 238. This embodiment allows for all of the links to occupy the same plane of operation.

The instability of the RV when jacked can be in any lateral direction. Utilizing the invention gives stability in a direction parallel to the length of the invention. To fully stabilize an RV, several units of the invention can be used. For example, the embodiment shown in FIG. 7 could be used in addition to the one shown in FIG. 4, even on the same jack. For the most effective stabilization, side to side stabilizing can be done on both ends of the RV, with at least one additional stabilizer in a front to back direction.

Figure 30:
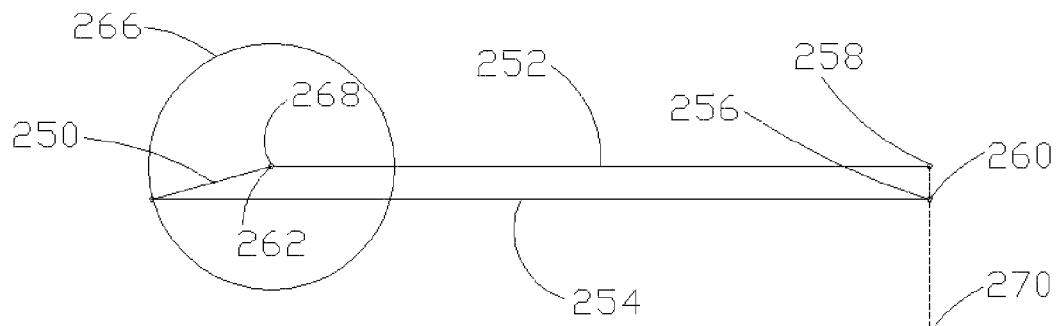
FIG. 30 is a schematic view of additional design elements of the jack stabilizer, adding in construction of the path of the short connecting link.
Figure 31:
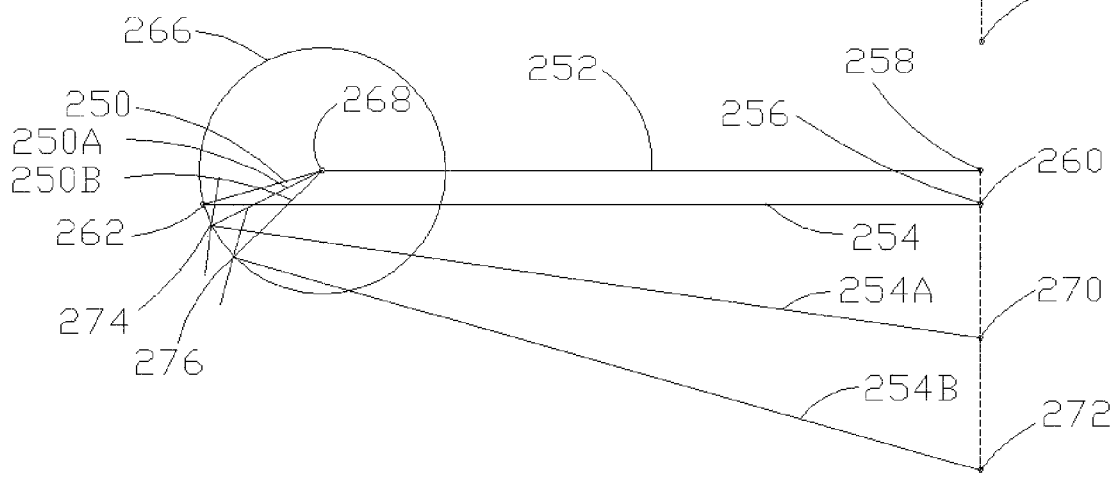
FIG. 31 is a schematic view of additional design elements of the jack stabilizer, adding in progressive positions of the short connecting link and stabilizing link.
Figure 32:
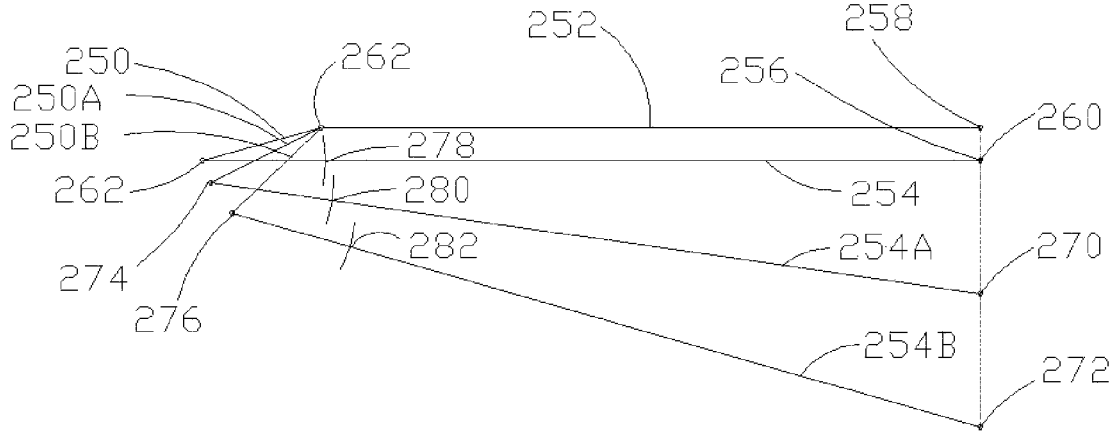
FIG. 32 is a schematic view of additional design elements of the jack stabilizer, adding in construction of one end location of the long connecting link.

The design of the four-link device 152 (see FIG. 13) can be constructed using a schematic diagram as shown in FIGS. 29 through 35. The goal is to achieve a nearly straight line vertical path for the distal end of the stabilizing link (36 in FIG. 1). To begin, the vertical range of the jack must be considered. For example, most scissors jacks found on RVs have an extended height of about 24". The retracted height of the jack is about 4", meaning that the range of support of the stabilizer is about 20". The schematic is constructed to show three different positions of the mechanism (retracted, midpoint and extended). Starting with FIG. 29, a horizontal line 252 is drawn to represent the base link of the invention. Then a vertical line 260 is drawn from the end 258 of the base link 252 to represent the desired path of the distal end 256 of the stabilizing link 254. An assumption is made for the length of the stabilizing link 254 which is parallel to, under and near the base link 252. The distal end 256 of the stabilizing link 254 also lies on line 260. Line 250 is then drawn to represent the short connecting link, which pivots with the base link 252 at point 262 and with the long connecting link 254 at point 264. As constructed, lines 252, 250 and 254 represent the base link, short connecting link and stabilizing link respectively in a retracted position. Points 258 and 256 also correspond to the upper and lower jack pivots 142 and 150 (see FIG. 13). Referring to FIG. 30, a circle 266 is then drawn with the center 268 at the point of intersection 262 between the base link 252 and the short connecting link 250, with its radius equaling the length of the short connecting link 250. This circle 266 represents the potential path of rotation of the short connecting link 250. Next midpoint 270 and extended 272 locations are marked on the vertical line 260. These points represent the midpoint and extended travel locations of the distal end 256 of the stabilizing link 254, which is sized to fit the range of vertical travel of the jack. Referring to FIG. 31, arcs, the length of the stabilizing link, are then drawn from points 270 and 272 to where they intersect the circle 266 at 274 and 276. Lines are then drawn from point 268 to 274 and from 268 to 276. These lines represent the short link 250 at midpoint 250A and extended 250B positions. Similarly, lines are then drawn from point 274 to 270 and from 276 to 272. These lines represent the stabilizing link 254 at midpoint 254A and extended 254B positions. To this extent of the construction, the base link 252, short connecting link 250, 250A, 250B and stabilizing link 254, 254A, 254B are shown at three positions within the travel of the mechanism (retracted, midpoint and endpoint). Referring to FIG. 32, an assumption is then made as to the joint location of the stabilizing link (28 on FIG. 1) to the long connecting link (24 on FIG. 1). This length can vary, but as a starting point, the length of the short stabilizing link 250 can be used. Arcs, the length of the short connecting link in this case, are then drawn from the short link to stabilizing link joints 262, 274, 276 to where they cross the stabilizing link at 278, 280 and 282. These points 278, 280 and 282 represent the path of the stabilizing link where it is joined to the long connecting link. As shown in FIG. 33, a radius is then drawn that passes through points 278, 280 and 282. The center of this radius 284 defines the length of the long connecting link and the location of where it joins the base link 252. FIG. 34 shows lines 286, 286A, 286B drawn between 284 and 278, 284 and 280 and between 284 and 282, schematically showing the long connecting link 286, 286A, 286B in the retracted, midpoint and extended positions. Finally, FIG. 35 shows an alternate method of finding the long connecting link to base link joint 284. Lines 288 and 290 are drawn from 278 to 280 and from 280 to 282 respectively. The intersection of the perpendicular bisectors 292, 294 of these two lines 288 and 290 will define the same point 284 as previously described. It is noteworthy that the constructed point of intersection 284 usually does not lie directly between the end points 258 and 262 of the base link 252. Also, it is possible to offset the assumed location of the joint 278, 280, 282 between the stabilizing link 254 and the long connecting link in order to effect a change of the location of the joint between the long connecting link and the base link 284. An example of this can be seen in the embodiment shown in FIGS. 7 through 12. In addition, this method of design is only a starting point and the lengths of any of the links can be changed to produce varying lengths of near straight line vertical travel of the stabilizing link 254 distal end, varying lengths and pivot locations of the long connecting link 286 to the base link 252, or both. Once a long connecting link 286 and pivot location 284 are selected, the actual path of the distal end 256, 270, 272 of the stabilizing link 224 can be determined using a drawing layout process or by geometry. It should also be noted that the actual path of the distal end 256, 270, 272 of the stabilizing link 254 may vary a slight amount from the vertical line 260 in between the three selected points 256, 270, and 272 on line 260. Many increments of travel of the mechanism should be determined to assure that the resulting variation of travel from line 260 is acceptable.

CONCLUSION, RAMIFICATIONS AND SCOPE

This invention provides an effective method of controlling lateral movement of RV jacks. This invention also automatically adjusts to the height of the jack as it is operated through its range of motion. In addition, this invention is readily adaptable to a wide range of jacks and is easily installed. While the description above contains many details, these should not be construed as limiting the scope of the invention, but as examples of embodiments of the invention. Accordingly, the scope of the invention should be determined by the claims, not the specifics of the embodiments.

What I claim is:

1. A jack stabilizing device comprising;
a) a base link;
b) a short connecting link;
c) a long connecting link;
d) a stabilizing link;
said base link attached to an RV,
said short connecting link having a first end pivotally attached to said base link,
said long connecting link having a first end pivotally attached to said base link, and
said stabilizing link pivotally attached to both a second end of said short connecting link and to a second end of said long connecting link comprising a four-link mechanism with said stabilizing link distal end pivotally attached to a jack,
said four-link mechanism structured so that lateral movement of said jack relative to said RV is limited.

2. A jack stabilizing device, as recited in claim 1, wherein said base link consists of an RV frame.

3. A jack stabilizing device, as recited in claim 1, wherein said base link is a separate component rigidly attached to an RV frame.

4. A jack stabilizing device, as recited in claim 1, wherein said base link is a separate component pivotally attached to an RV frame.

5. A jack stabilizing device, as recited in claim 2, wherein said short connecting link consists of an upper outboard leg of a scissors jack, and said stabilizing link consists of a lower outboard leg of a scissors jack with a distal end of said stabilizing link pivotally attached to a foot of the jack.

6. A jack stabilizing device comprising;
a) a base link;
b) a short connecting link;
c) a long connecting link;
d) a stabilizing link;
said base link consisting of an RV frame,
said short connecting link consisting of an upper outboard leg of a scissors jack having a first end pivotally attached to said base link,
said long connecting link having a first end pivotally attached to said base link,
said stabilizing link consisting of a lower outboard leg of the scissors jack and being pivotally attached to a second end of said short connecting link and pivotally attached to a second end of said long connecting link comprising a four-link mechanism with said stabilizing link's distal end pivotally attached to a foot of the scissors jack,
said four-link mechanism structured so that lateral movement of the scissors jack relative to said RV frame is limited.

7. A jack stabilizing device comprising;
a) a base link;
b) a short connecting link;
c) a long connecting link;
d) a stabilizing link;
said base link pivotally attached to an RV frame,
said short connecting link having a first end pivotally attached to said base link,
said long connecting link having a first end pivotally attached to said base link, and
said stabilizing link pivotally attached to both a second end of said short connecting link and to a second end of said long connecting link comprising a four-link mechanism with said stabilizing link distal end pivotally attached to a jack,
said four-link mechanism structured so that lateral movement of said jack relative to said RV frame is limited.

8. A jack stabilizing device, as recited in claim 3, wherein said base link, said short connecting link, said long connecting link and said stabilizing link are made from channel shaped material wherein said stabilizing link can be nested inside said long connecting link and said short connecting link and wherein said long connecting link and said short connecting link can be nested inside the base link thereby allowing the four links to occupy and operate in the same plane.

* * * * *